US009033797B1

(12) United States Patent
Karpiuk et al.

(10) Patent No.: US 9,033,797 B1
(45) Date of Patent: May 19, 2015

(54) MULTIPLE USER VIEWING MODES OF AN ENVIRONMENT

(71) Applicant: Wargaming.net LLP, Walthamstow (GB)

(72) Inventors: Andrew Karpiuk, Minsk (BY); Vitaliy Borodovsky, Minsk (BY)

(73) Assignee: Wargaming.net LLP, London (GB)

( * ) Notice: Subject to any disclaimer, the term of this patent is extended or adjusted under 35 U.S.C. 154(b) by 0 days.

(21) Appl. No.: 14/206,611

(22) Filed: Mar. 12, 2014

(51) Int. Cl.
*G06F 17/00* (2006.01)
*A63F 13/90* (2014.01)

(52) U.S. Cl.
CPC ...................................... *A63F 13/08* (2013.01)

(58) Field of Classification Search
CPC ................................. A63F 13/08; A63F 13/10
USPC ...................................................... 463/30–33
See application file for complete search history.

(56) References Cited

U.S. PATENT DOCUMENTS

| 7,350,215 | B2 * | 3/2008 | Shenfield et al. | 719/319 |
| 8,577,517 | B2 * | 11/2013 | Phillips et al. | 701/2 |
| 2006/0040239 | A1 * | 2/2006 | Cummins et al. | 434/62 |
| 2012/0231886 | A1 * | 9/2012 | Gomez et al. | 463/32 |

OTHER PUBLICATIONS

"Call of Duty: Ghost Sniper Multiplayer Gameplay—COD Ghosts (Sniper Rifle Footage)", http://www.youtube.com/watch?v=lucYDQHz4as, published on YouTube.com Aug. 14, 2013.

* cited by examiner

*Primary Examiner* — Ronald Laneau
(74) *Attorney, Agent, or Firm* — Banner & Witcoff, Ltd.

(57) ABSTRACT

Methods and systems for providing multiple viewing modes of a simulated environment are described herein. The different viewing modes may include a magnified view of the environment, an unmagnified view, and/or a magnified view combined with an unmagnified view. The different viewing modes may include a model of a user controlled object which mimics the movement of the user controlled object to provide the user with information regarding the positioning or orientation of the user controlled object with respect to the user's current view. In the different viewing modes, a potential damage indicator may be provided on a targeted object to indicate potential damage to the targeted object based on a current weapon selection.

20 Claims, 15 Drawing Sheets

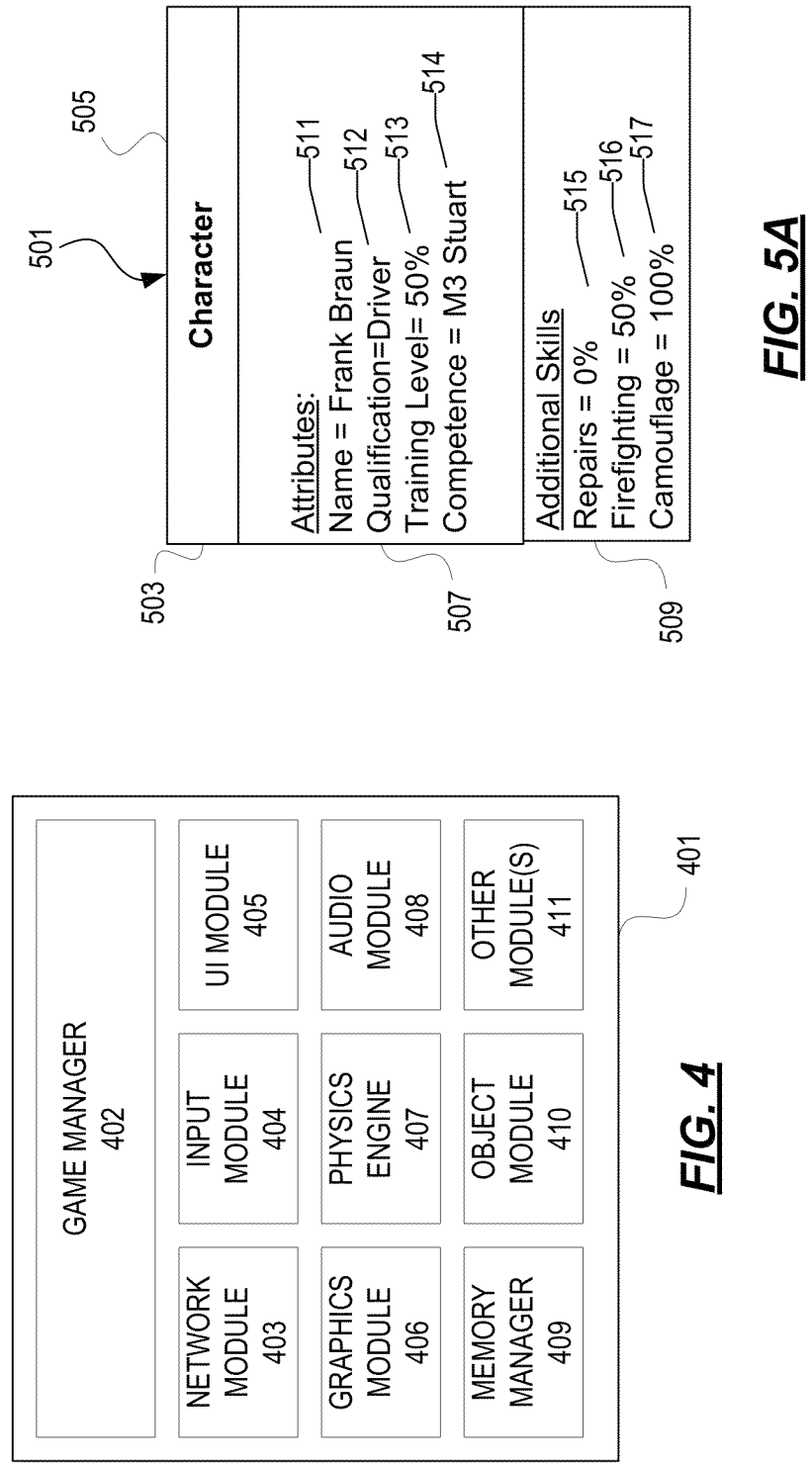

Vehicle — 555, 551

Attributes: —561
Name: Liechttraktor —563
Hit Points: 110
Weight/Load limit: 7.5/9.2 —564
Engine Power (h.p.) = 51 —565
Speed Limit = 46 km/h —566
Hull Armor (front/side/rear mm)= 14/12/12 —567
Turret Armor (front/side/rear mm) = 14/12/12 —568
Standard Shell Damage = 24-40 —569
Standard Shell Penetration (mm) 26-43 —570
Rate of Fire (rounds/min) = 30 —571
Turret Traverse Speed (deg/sec) —572
View Range (m) = 270 —573
Signal Range (m)= 100 —574

557

Module: —575
Gun: 37 mm M-5
Turret: D37812 —576
Engine: Continental W-670 —577
Suspension: Stuart E1 —578
Radio: SCR 209 —579
Additional: —580

MULTIPLE USER VIEWING MODES OF AN ENVIRONMENT

FIELD

Aspects of the disclosure relate to computer systems, computer software, and video games. More particularly, aspects of the disclosure relate to video game software, including multiple viewing modes.

BACKGROUND

Video games are increasingly popular. Online multiplayer video games have become particularly popular due, at least in part, to the ability of players to compete with multiple other human players.

Popular genres of multiplayer games include the first-person-shooter (FPS) and the third-person shooter genres. In FPS games, the player's on-screen view simulates the view of the character or vehicle controlled by the player; that is, the first-person view. The object of many FPS games is to accomplish a goal within a game. Common goals include killing other game characters that represent other players, capturing flags that represent opponents' territory, assaulting another team's base, and the like. Third person shooter games often have similar goals but differ in the perspective of the player. In third person shooter games, the player views the game world from above or behind the character or vehicle controlled by the player. Typically, the player is provided with the option of viewing faraway objects in the environment in more detail such as a sniper mode in which the view simulates the view through a sniper rifle scope. While in the sniper mode, the environment surrounding the player's character or vehicle is not shown.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Methods and apparatuses for providing different views of a simulated environment are described herein. According to an aspect, a user can view the simulated environment in a first mode with a first magnification level and change to another viewing mode containing a magnified and an unmagnified view which may be controlled manually or automatically. The magnified view may be magnified for the area or portion of the environment viewed through a reticle. The user may also be able to adjust the magnification level of the magnified view.

According to another aspect, a model of a user controlled object may be displayed on the screen to provide the user with information about the orientation of the user controlled object. The second version may be a model of the full size version of the user controlled object, and the second version of the user controlled object may be displayed while the user is in a magnified viewing mode. The orientation of parts of the second version may be the same as the orientation of parts of the first version. The second version may further be provided with a directional indicator to provide the user with information regarding the movement direction of the user controlled object.

According to yet another aspect, a potential damage indicator may be displayed on screen to provide a user with information about damage which a targeted object may receive from a selected weapon. When the selected weapon is changed, the potential damage indicator can also change to reflect the potential damage which a targeted object may receive from the newly selected weapon.

The methods described herein may be performed based on instructions stored on a statutory computer readable medium, or executed by a virtual environment server configured to perform as described herein.

These and other aspects will be apparent upon reading the detailed description below.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 4 illustrates a block architecture diagram of software modules that may be used to implement various features described herein.

FIG. 5A illustrates an instance of a character object according to various features described herein.

FIG. 5B illustrates an instance of a vehicle object according to various features described herein.

DETAILED DESCRIPTION

In the following description of the various aspects, reference is made to the accompanying drawings, which form a part hereof, and in which is shown by way of illustration how various features described herein may be practiced. It is understood that other embodiments may be used and structural and functional modifications may be made.

Figure 1:
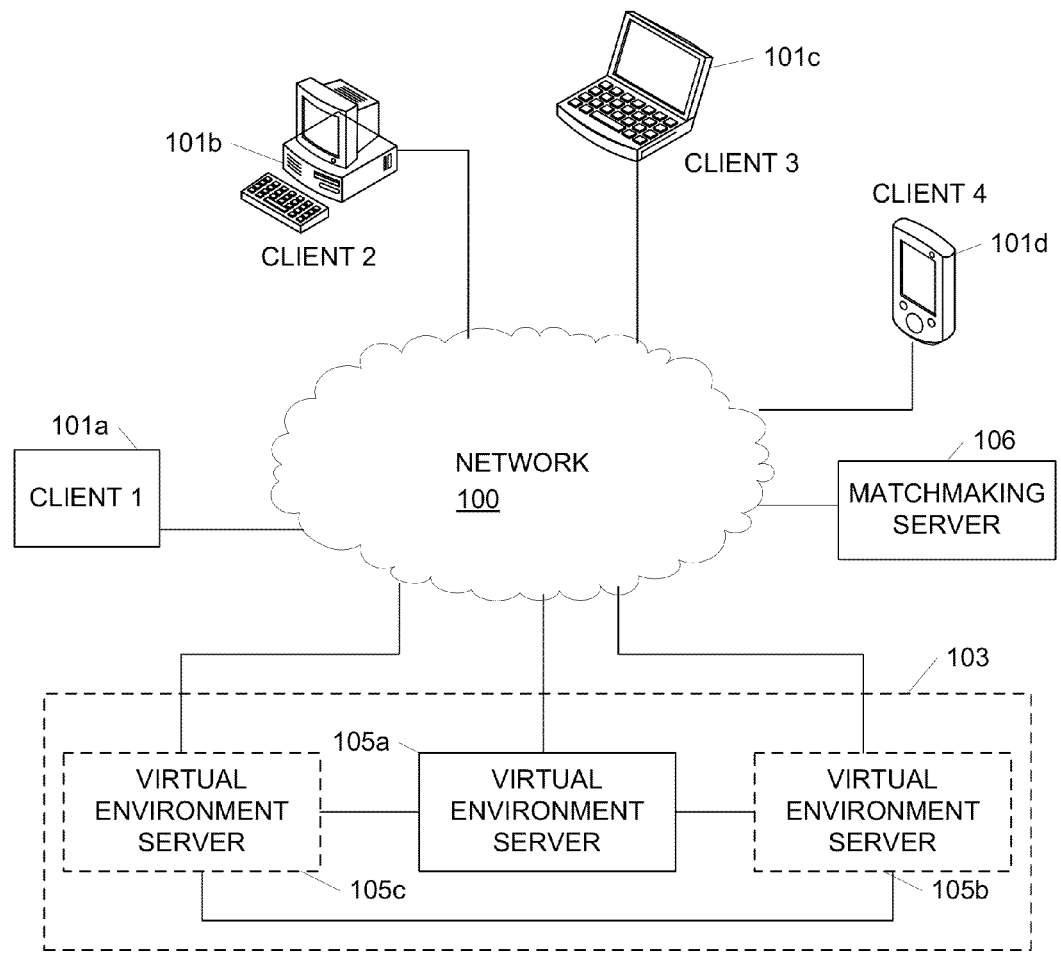
FIG. 1 is an illustrative network environment in which one or more aspects described herein may be used.

FIG. 1 illustrates a network environment in which clients 101 may interact with virtual world servers 105 to provide a virtual world for users to access. Clients 101 may include a variety of devices including generic data processing device 101a, personal computer (PC) 101b, laptop, portable, or netbook computer 101c, personal data assistant, mobile phone or device 101d, a tablet device (not shown) and the like. Each of clients 101 may have a network adapter that allows clients 101 to connect to virtual world servers 105 through network 100. In one example, network 100 may include an Internet Protocol (IP) based network, e.g., the Internet. Other networks may include cellular networks, cable networks, fiber optic networks, wireless networks, wired network and/or combinations thereof. Network 100 may further include one or more sub-networks such as wired or wireless local area networks (LANs), wide area networks (WANs), and the like.

In one or more arrangements, virtual world servers 105 may be included in a virtual world server system 103 that includes multiple linked physical and/or logical servers 105. Using such a distributed system, servers 105 may be able to distribute load across each of server 105. For example, if server 105a is experiencing high loads, some of the operations may be passed to either server 105b or 105c or both. Load may further be distributed based on user geography or on other predetermined bases. Alternatively, the virtual world may be hosted on a single server, e.g., virtual world server 105a. Each of servers 105 may collectively generate and manage a single instance of the virtual world, or each server 105a, 105b and 105c may provide independent instances of the world. An instance of a virtual world, as used herein, describes a stand-alone instance of the virtual world that does not interact with or depend on other instances of the virtual world. Depending on the processing load, a virtual world server system 103 may divide a plurality of users among multiple instances of the virtual world, to reduce or alleviate overloading on a single server or prevent overpopulation. Each server 105 may be logical or physical, e.g., multiple logical servers may reside and be running on the same physical computing device/server, or servers may be physically separate devices.

The network environment of FIG. 1 may also associate with one or more matchmaking servers 106 such as a system of servers. For example, a matchmaking server 106 may determine what set of players to assign to a same instance of the virtual world to ensure that all players meet predefined criteria for that instance of the virtual world. As another example, player account information may be stored on a central server and matchmaking may occur on periphery servers distributed in various geographic locations to ensure better performance. Alternatively, a single server may work in stand-alone mode.

Figure 2:
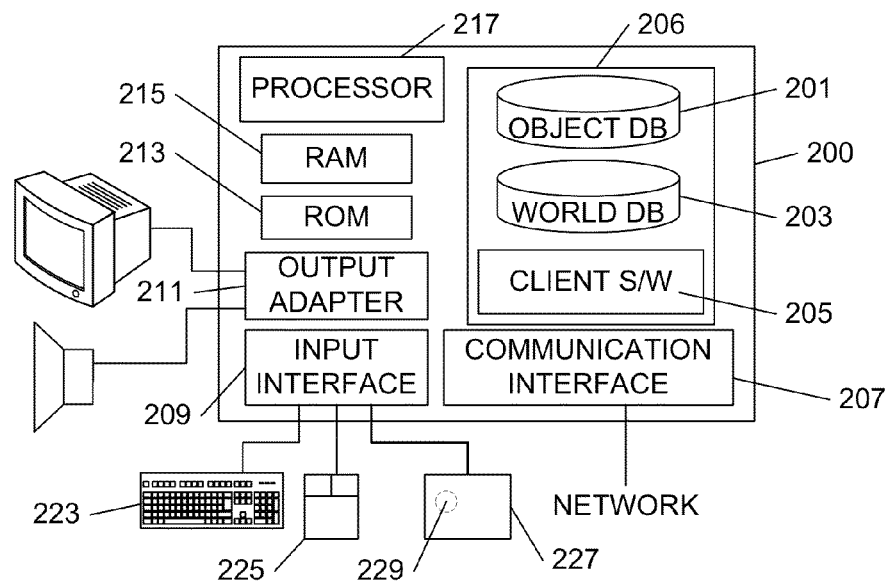
FIG. 2 is a block diagram illustrating an example virtual world client according to one or more aspects described herein.

FIG. 2 illustrates an example client device 200 such as PC 101b, laptop, portable, or netbook computer 101c, personal data assistant, mobile phone or device 101d, or a tablet device (FIG. 1) that may be used to access and interact with a virtual world provided by a virtual world server such as server 105a of FIG. 1. Client device 200 may include a variety of components and modules including a processor 217, random access memory (RAM) 215, read only memory (ROM) 213, databases 201 and 203, client software 205, output adapter 211, input interface 209 and communication interface 207. Software, databases, operating systems, and the like may be stored in nonvolatile memory 206 (e.g., a magnetic disk or solid state hard drive, or equivalent). Object database 201 may be configured to store data defining and otherwise associated with an object used by a user of device 200 to explore and interact with the virtual world. World database 203, on the other hand, may be configured to store data for defining and generating the environment in which the objects exist. For example, world database 203 may store texture maps for rendering a floor or ground, walls, a sky and the like. In another example, world database 203 may store simulated environments, buildings, trees and other data defining animate or inanimate objects existing in the world, data defining computer controlled characters and the like. Each of database 201, 203 may or may not be a conventional database, and instead may refer to data stored in a memory, accessed as needed by the client software. Data associated with an object or the virtual world may be communicated between client device 200 and a virtual world server using communication interface 207. For example, object positions, attributes and status may be updated or environments may be changed by communicating such data through interface 207.

The world and the objects may be graphically rendered by client software 205 and subsequently sent to output adapter 211 and display 219. The client software 205 may, in one or more arrangements, be configured to generated three dimensional (3-D) models of the virtual world and components thereof as well as the object corresponding to a user. A user may control the object and interact with the world through input interface 209 using various types of input devices including keyboard 223 and mouse 225, and one or more touch sensors 227 that sense when a user has pressed his or her finger at various locations, such as location 229. In some embodiments the one or more touch sensors 227 may be included in a touch pad, touch screen or the like. Devices that include one or more touch sensors 227 may detect various gestures performed by a user as one or more of his or her fingers are pressed onto the one or more touch sensors 227 (or the touch pad, touch screen, etc.). There are various types of touch sensors that a device may use, including capacitive touch sensors and resistive touch sensors. Some touch sensors may be usable with a stylus and a user may use the stylus instead of his or her finger to provide input to the touch sensor. Additionally, some touch sensors may be able to detect a single touch, while other touch sensors may be able to detect multiple touches at a given time. Other types of input devices may include a microphone (e.g., for voice communications over the network), joysticks, motion sensing devices and/or combinations thereof. In one or more arrangements, music or other audio such as speech may be included as part of the virtual world. In such instances, the audio may be outputted through speaker 221.

Client software 205, computer executable instructions, and other data used by processor 217 and other components of client device 200 may be stored RAM 215, ROM 213, nonvolatile memory 206 or a combination thereof. Other types of memory may also be used, including both volatile and nonvolatile memory. Software 205 may provide instructions to processor 217 such that when the instructions are executed, processor 217, client device 200 and/or other components thereof are caused to perform functions and methods described herein. In one example, instructions for generating a user interface for interfacing with the virtual world server may be stored in RAM 215, ROM 213 and/or nonvolatile memory 206. Client software 205 may include both applications and operating system software, and may include code segments, instructions, applets, pre-compiled code, compiled code, computer programs, program modules, engines, program logic, and combinations thereof. Computer executable instructions and data may further be stored on some physical form of computer readable storage media (referred to herein as "computer memory") including, e.g., electrically erasable programmable read-only memory (EEPROM), flash memory or other memory technology, CD-ROM, DVD or other optical disk storage, magnetic cassettes, magnetic tape, magnetic storage and the like.

Figure 3:
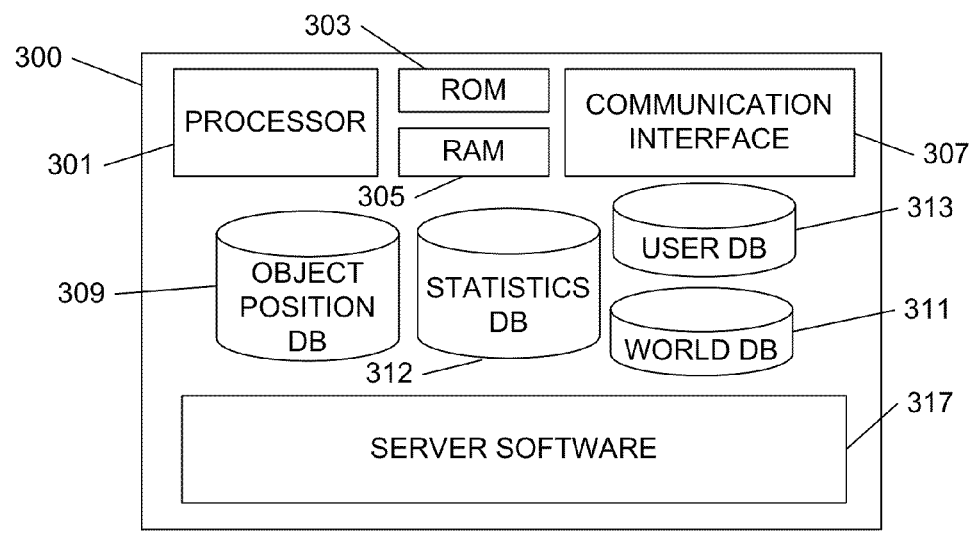
FIG. 3 is a block diagram illustrating an example virtual world server according to one or more aspects described herein.

Referring now to FIG. 3, a virtual world server 300 (e.g., an instance of server 105) may be configured to generate and operate a massive multiplayer online game, such as virtual world or the like. Server 300 may include processor 301, ROM 303, RAM 305, communication interface 307, object position database 309, world database 311, user database 313, server software 317, and a statistics database 312. Object position database 309 may be configured to store position information for each object (e.g., based on commands to move a vehicle received from each client). The statistics database 312 may be configured to store and/or transfer statistics relevant to game operation, including, for example, tracking player achievement and general game server performance.

A world database 311 may store rules, algorithms and other data for interactions that are available in the world. For example, a manner in which a computer controller character moves or otherwise behaves may be defined in data stored in world database 311. Additionally, item information may be defined in world database 311 so that items may not be modified by each client. In another example, world database 311 may store location information for non-object items and components. User database 313, on the other hand, may be configured to store information describing a user controlling an object. For example, user database 313 may include account information, user preferences, one or more classes of user experience points and/or levels, payment information, user identification information, character definitions, state tables, and the like. Each of databases 309, 311, 312, 313 may or may not be a conventional database, and instead may refer to data stored in a memory, accessed as needed by the server software. For example, user database 313 may in fact be a collection of multiple databases or database tables.

Features described herein may be used with or in a variety of video games, including but not limited to, WORLD OF TANKS®, World of Tanks Blitz™, and World of Tanks 360 by Wargaming.net®. Aspects described herein may also be used with other video games and are not limited to any one genre or implementation. Aspects described herein may be implemented in video game application software stored on a computer readable medium, e.g., storage 201, 203, 205, 206, 213, 215, 309, 311 312, and/or 313, and executable by a data processing device.

Various aspects of the disclosure provide features and capabilities that enhance game play by providing options through which users can develop strategies to play the video game. According to various aspects described herein, a video game may provide a graphically simulated virtual world or virtual environment, in which the game takes place, referred to herein interchangeably as a virtual world and as a simulated environment of the video game. The simulated environment may have features similar to actual geographic locations or may have fictional, science fiction or fantasy-themed environments.

FIG. 4 illustrates a block diagram of a video game software application 401. Each block in FIG. 4 illustrates a logical software module or function that performs an action, provides a capability or feature, implements an object, or performs some other aspect of the video game. When the video game software 401 executes on a data processing system such as a PC or game console, the modules operate collectively to provide a video game experience to a player. The modules illustrated in FIG. 4 are illustrative only, and additional or different modules may be used. The same, additional or different modules may be executed in tandem on a server with which each client device is connected.

Video game software 401 may include, e.g., a game manager module 402, which manages the overall operation of the video game and may be the initial module launched when the video game is executed. Video game software 401 may also include a network module 403, which manages network games sessions and communication with one or more game servers. A network game session may include e.g., a co-operative campaign with other networked players, or other compartmentalized periods of game play involving players located at discrete network locations. A memory manager module 409 performs memory management during execution of the video game 401. An input module 404 may receive and interpret user input via a game controller, keyboard, mouse, and the like, and provide the interpreted commands to game manager 402, network module 403, or other applicable module. UI module 405 may manage and control the user interface, including the display displayed on the video output device, interpreting input via the input module 404, and providing audio output via audio module 408.

Various software modules may operate with one or more classes or objects defined and used in the video game 401. The classes and objects may be defined with reference to an object module 410, and may include portions of executable software code and/or one or more data structures, depending on the object. Each object may be rendered and simulated in the virtual world in accordance with a physics engine 407. Video game software 401 may include other software modules 411 as needed. FIG. 4 illustrates one possible software architecture. Others may be used. Each module depicted in FIG. 4 may communicate directly or indirectly with each other module, e.g., by passing objects, data, parameters, input, and output, etc.

A first class of in-game objects may define characters in the video game. One or more characters may be defined by various attributes associated with the character, e.g., name, physical appearance, skills, etc. Skills may be defined based on a character's genre or task, e.g., gunners, tank commanders, and drivers in the present example. A gunner may have skills such as aiming accuracy and aiming speed, a tank commander may have skills that regulate the overall efficiency of the tank crew, a driver may have skills that determine the vehicle speed or precision of direction. Additional character attributes may include one or more other skills that can improve performance of the character or vehicle so as to enhance the strategic gaming experience such as firefighting skills, the ability to repair vehicles, the ability to camouflage vehicles, and the like. One crew member (e.g., a commander) may represent multiple crew members.

A second class of in-game objects may define vehicles in the video game. A vehicle may be defined as any simulated inanimate object directly or indirectly controllable by or dependent on an in-game character or user/player. Illustrative vehicles may include tanks, airplanes, ships (and/or submarines), and the like. Vehicles may have various attributes and functions that provide advantageous qualities to the vehicle during combat. For example, some vehicles might be fast with minimal firepower, whereas other vehicles may be slower but extremely powerful. Infinite variations of strength, speed, defense, and any other attribute are possible.

Object module 410 may provide an array of vehicles, vehicle components, characters and other equipment. Vehicles, vehicle components, characters and other equipment may be defined by one or more objects and instantiated during the game. Each object may have various attributes and functions and provide advantages and disadvantages based thereon. A vehicle component may refer to an upgradeable component of a vehicle, e.g., armor plating, engine, guns, etc.

FIG. 5A illustrates a block diagram of an instance 501 of a character object. Object instance 501 has an object class 505 (Character). Instance 501 may acquire one or more attributes from the object class. Attributes 507, when examined, define a state of the instance. In this example, the Character has the following attributes: Name 511, Qualification 512, Training Level 513, and Competence 514. A character may also have additional skill types 509. Additional skill types may include Repair Skills 515, Firefighting skills 516, and Camouflage skills 517. Other skill types, attributes, etc., may also or alternatively be used.

Each attribute may have a particular value. The attribute may have a default value inherited from the Qualification type 512. For some attributes, a player may increase attribute value by allocating experience points, gained during gameplay, to the character. Increased attribute value enhances gameplay by improving performance of the vehicle containing the characters. For example, by allocating experience points to the gunner of a tank, the Training Level 513 may be increased resulting in more accurate gun pointing by a vehicle containing that character, leading to improved vehicle performance during battle. Similarly, the effectiveness of the additional skill types is increased in accordance with the value of the skill Thus, for example, a Firefighting skill 516 value of 100% is proportionally more effective than a value of 50%. Increased firefighting effectiveness results in reduced damage to the vehicle in the event of a fire. By staffing a vehicle with characters having improved attributes and skills, vehicle performance is maximized allowing for a more effective performance during game play.

In some embodiments, attributes might not be able to be changed. Qualification 512 may not be changed; for example, a driver may not be retrained as a gunner. A character's Competence attribute 514 refers to their ability to operate a specific vehicle type; for example a specific type of tank such as the M3 Stuart tank. Competence 514 may be changed by retraining the character to operate the same Qualification 512 on a different vehicle. Changing Competence 514 may result in a decreased Training Level 513 in the new vehicle. Additional experience points may be used to raise the Training Level 513 in the new vehicle. A character may eventually be associated with multiple competence attributes—one per vehicle the character has been associated with.

FIG. 5B illustrates a block diagram of an instance 551 of a vehicle object. Object instance 551 has an object class 555 (Vehicle). Instance 551 may acquire one or more attributes 557 from the object class. Attributes 557, when examined, define a state of the instance. In this example, object instance 551 is a Liechttraktor Tank and has attributes associated with tank properties. Exemplary attributes include Name 561, Hit Points 563, Weight/Load limit 564, Engine Power (h.p.) 565, Speed Limit 566, Hull Armor 567, Turret Armor 568, Standard Shell Damage 569, Standard Shell Penetration 570, Rate of Fire 571, Turret Traverse Speed 572, View Range 573, and Signal Range 574. These attributes contribute to the vehicle's effectiveness in combat. Attribute types may also have an attribute value, which determines the effectiveness of the attribute function. For example, the Speed Limit attribute 566 has a value of 46 km/h, which indicates how fast the vehicle can travel. One or more of the attributes, alone or in combination, may be used to assign the vehicle to a subclass. In this example, vehicle 551 may be in a subclass of tanks referred to as "Light Tanks" based on hit points, speed, armor, etc. Other classes of tanks may include medium tanks and heavy tanks, among others. Subclass may be used to quickly identify to a user a general approximation of attributes associated with a vehicle without requiring the user to review each attribute in detail.

Aspects of the disclosure involve providing a user with different views of a virtual world or three-dimensional simulated environment. Aspects of the disclosure also include providing the user with additional information in the different views of the environment and gameplay information.

Various examples described throughout this disclosure will be described in terms of a user or player touching or pressing a control. Such embodiments may include a device with a touch screen that allows a user or player to press his or her finger (or a stylus or other item that can be detected by a touch sensor of the touch screen) onto the touch screen to provide touch and/or gesture input. When terms such as touch, press, or gesture are used, it can be understood that the computing device is detecting the touch and/or gesture input via one or more touch sensors and/or one or more processors of the computing device. For example, one or more touch sensors may detect a user's touch and provide a signal to the one or more processors representing the touch. The one or more processors may process the signal to determine a location of the touch and/or a direction of the touch. Based on one or more signals received from the touch sensor, the one or more processors may determine that a gesture is being performed by the user (e.g, the user may be swiping or dragging his or her finger across the touch screen). Software, such as the video game application (see e.g., FIG. 4), may have access to the touch and/or gesture input (e.g., via the operating system of the device) and may perform additional processing to interpret the touch and/or gesture input. Some instances may include processing the touch and/or gesture input based on a user interface being displayed to the user and responding to the touch and/or gesture input by updating the user interface and/or controlling an object of the virtual world).

The various examples described throughout this disclosure are not meant to be limited to a touch screen device or a similar device with a touch sensor. Aspects of the disclosure may be used in a device that has a display screen and a different input device, such as a keyboard or mouse.

Using Modules to Display Different Views of the Virtual World

A player or user can provide input to manipulate or control an object in a virtual world or three-dimensional simulated environment or change views of the virtual world or simulated environment through the input module 404 of video game software 401 which can communicate with a virtual world server 300 such as a virtual environment server 105. The input module 404 can pass the user input to the other modules including the UI module 405 to cause changes in the environment or views to be displayed on a display device in response to the user input. Through manipulation of an object in the environment such as a vehicle or character, the user can interact with the simulated environment and view different portions of the environment. The user can further view the environment through a number of different viewpoints and viewing ranges including a first-person view and a third-person view, and the user can change between different viewing modes and/or viewpoints. For example, if the controlled object is a tank vehicle, the player's point of view may be a first-person view from the viewpoint of a character located in the vehicle or a third-person view from a point a short distance behind the user controlled character or vehicle. The distance for the third-person view from behind the user controlled character or vehicle can vary depending on the terrain and viewing modes. The direction of the player's view of the environment may be controlled together with the direction in which a weapon is aimed. The direction of the player's view of the environment may also be changed independently of the direction of a weapon. The player can further control the character or vehicle independently of the direction of the view such that the forward direction for a player's character or vehicle may be in a direction different than the direction of the view being displayed.

In accordance with aspects of the disclosure, a player may be able to switch between viewing modes to view objects in the environment which appear a long distance away from the player's viewpoint in more detail or to view portions of the environment with different magnification levels. For example, a first viewing mode may be a normal or unmagnified view of the environment with objects shown having sizes relative to their distances from a player's viewpoint. In a second viewing mode, a player may have a magnified or zoomed in view of a portion of the environment. In another viewing mode, a portion of the on-screen view may be a first view and another portion of the on-screen view may be a different view. The magnified views may also provide additional information to the user in the form of, for example, a potential damage indicator. Examples of aspects of these different viewing modes are illustrated in and described with respect to FIGS. 6-14.

Figure 6:
FIG. 6 illustrates a screenshot of a video game user interface implementing one or more illustrative aspects described herein.

FIG. 6 illustrates a video game user interface using first viewing mode 600, e.g., a third-person view. FIG. 6 includes a general environment in which a controlled object such as a player's character or vehicle 602 may be located. Tank vehicle 602 may have independently controllable and movable parts such as a turret 608 and a hull 610. Turret 608 and hull 610 of tank vehicle 602 may independently pivot with respect to each other. Controls in the form of on-screen controls or virtual controls may be provided to interact with the video game and control various features such as manipulating the tank vehicle 602, the aim, and/or view. FIG. 6 shows an ammunition selection panel 616, a firing button 618, a virtual joystick 620, a viewing mode button 622, a consumables panel 624, and a view controller 626.

A second vehicle 604 may be located in the environment such as an enemy vehicle. A reticle or sight guide 606 which may be used to assist in targeting and aiming is shown on the screen to provide the player with information regarding the direction, distance, and point at which a weapon (e.g., a gun, missile, or other projectile weapon) may be directed. A point of aim 612 may be provided in the center of the reticle 606 to indicate the specific point at which the weapon is aimed. For an object in the distance, the player may find it difficult to determine the particular point on the object at which the gun is aimed. To increase the ease of aiming and accuracy, the player may switch to another viewing mode in which a more detailed or magnified view of a selected area of the environment is shown.

Figure 7:
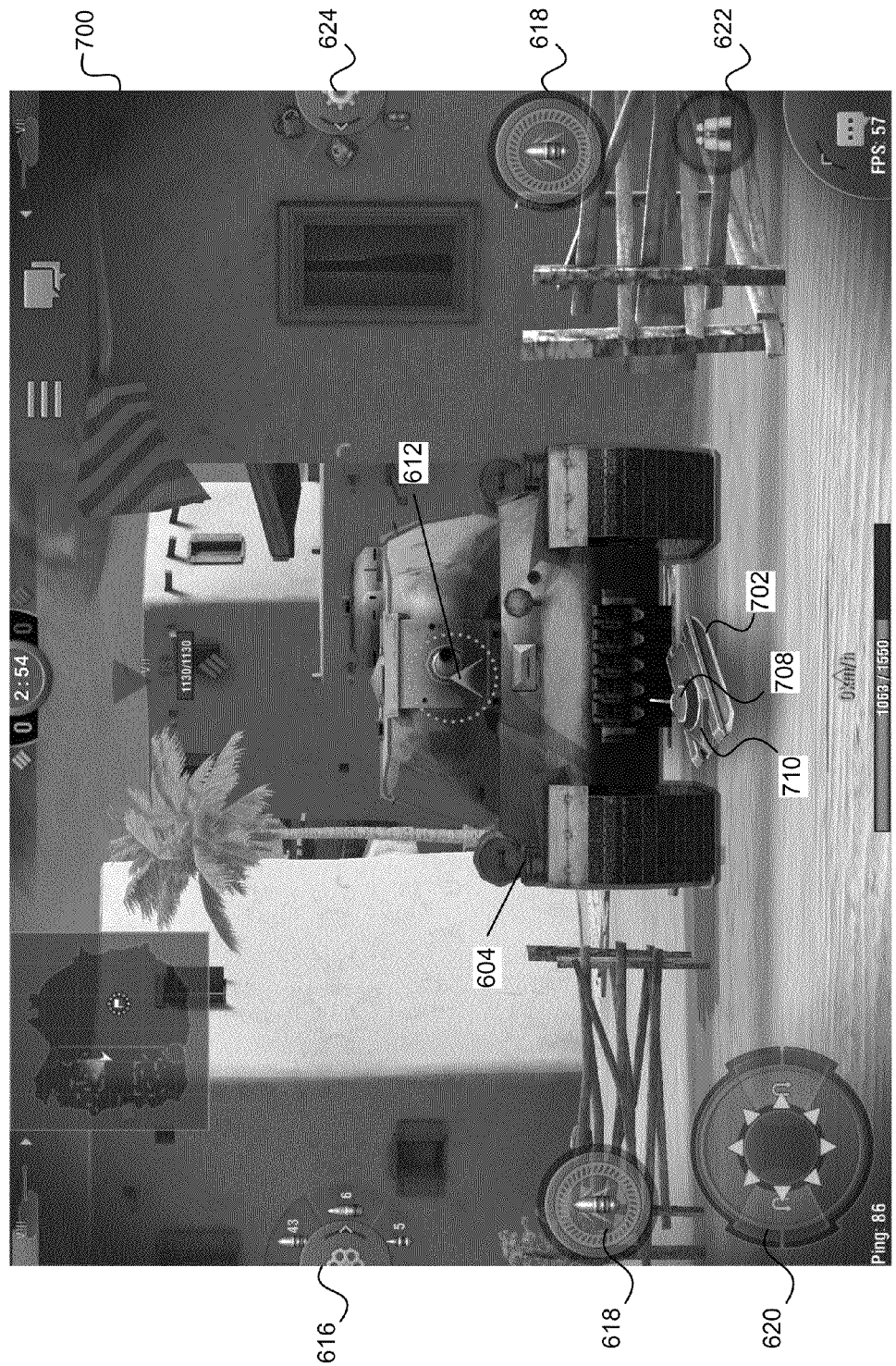
FIG. 7 illustrates a screenshot of a video game user interface implementing one or more illustrative aspects described herein.

In accordance with some aspects, FIG. 7 shows an illustrative second viewing mode in which the area in and around reticle 606 is magnified or zoomed in, e.g., representative of a first person view. The magnified view may simulate viewing an environment through a telescopic sight or scope or binoculars. The player can enter a viewing mode by selecting a viewing mode button 622. In response to the viewing mode button 622 selection, video game software 401 or a virtual world server can generate or render the magnified view and cause the display to show the magnified view of a portion of the simulated environment using modules such as UI module 405 and graphics module 406. Depending on the magnification level, video game software 401 can cause the size of the area and/or number of pixels displaying each portion of the environment to be increased over a lesser magnification level of the same area. In other words, the higher the magnification level, the more pixels or screen area are used to show the same portion of the environment. The magnified or zoomed area may be centered around the center of the reticle which may also be point of aim 612.

FIG. 7 shows a screenshot 700 of the second viewing mode of the environment shown in FIG. 6. In this viewing mode, the screen may be entirely replaced with the magnified view. With the magnified view, the player can more precisely aim a weapon at an opposing vehicle 604. The player can control movement of the vehicle using a virtual joystick 620 and control firing of the weapon using a fire button 618, which can provide input to input module 404. Visual indicators may be provided in response to receiving a movement command such as a directional indicator which will be described in more detail with respect to FIGS. 8 and 9. The player can control the view and/or aiming direction of the weapon using another virtual or hardware input option such as by swiping the screen or dragging a point on the screen, using hardware buttons mapped to commands for viewing direction changes, or using an accelerometer and/or gyroscope to detect tilting of a device which may also be used to control the view or aiming direction of the weapon. The player may further control the view displayed independently of the aiming direction of the weapon by swiping the screen or dragging a point on the screen in a particular area such as the tracked area 626 shown at the bottom of the screen in FIG. 6. Input can also be provided using hardware input devices such as a keyboard, mouse, joystick, or controller. To change to another viewing mode, the player can select a viewing mode button such as button 622. Similar to FIG. 6, the second viewing mode may include a point of aim 612 to indicate the target of a weapon. In FIG. 7, the point of view may be a first-person view simulating aiming a weapon or viewing the environment through a scope. Since the view shown by the viewing camera and the aiming of the weapon may differ, FIG. 7 shows the instance where the viewing camera and aiming of the weapon are the same.

Figure 8:
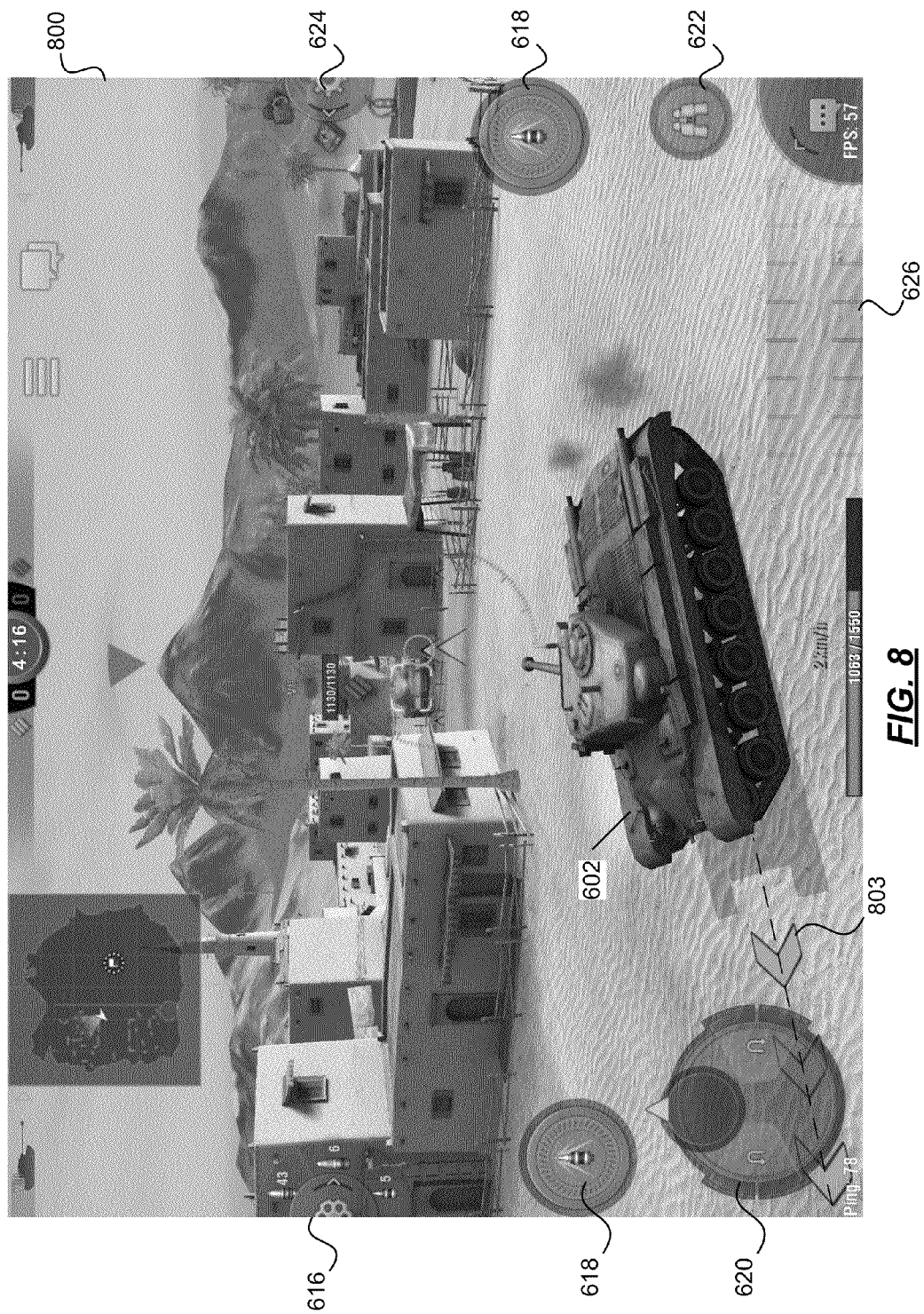
FIG. 8 illustrates a screenshot of a video game user interface implementing one or more illustrative aspects described herein.
Figure 9:
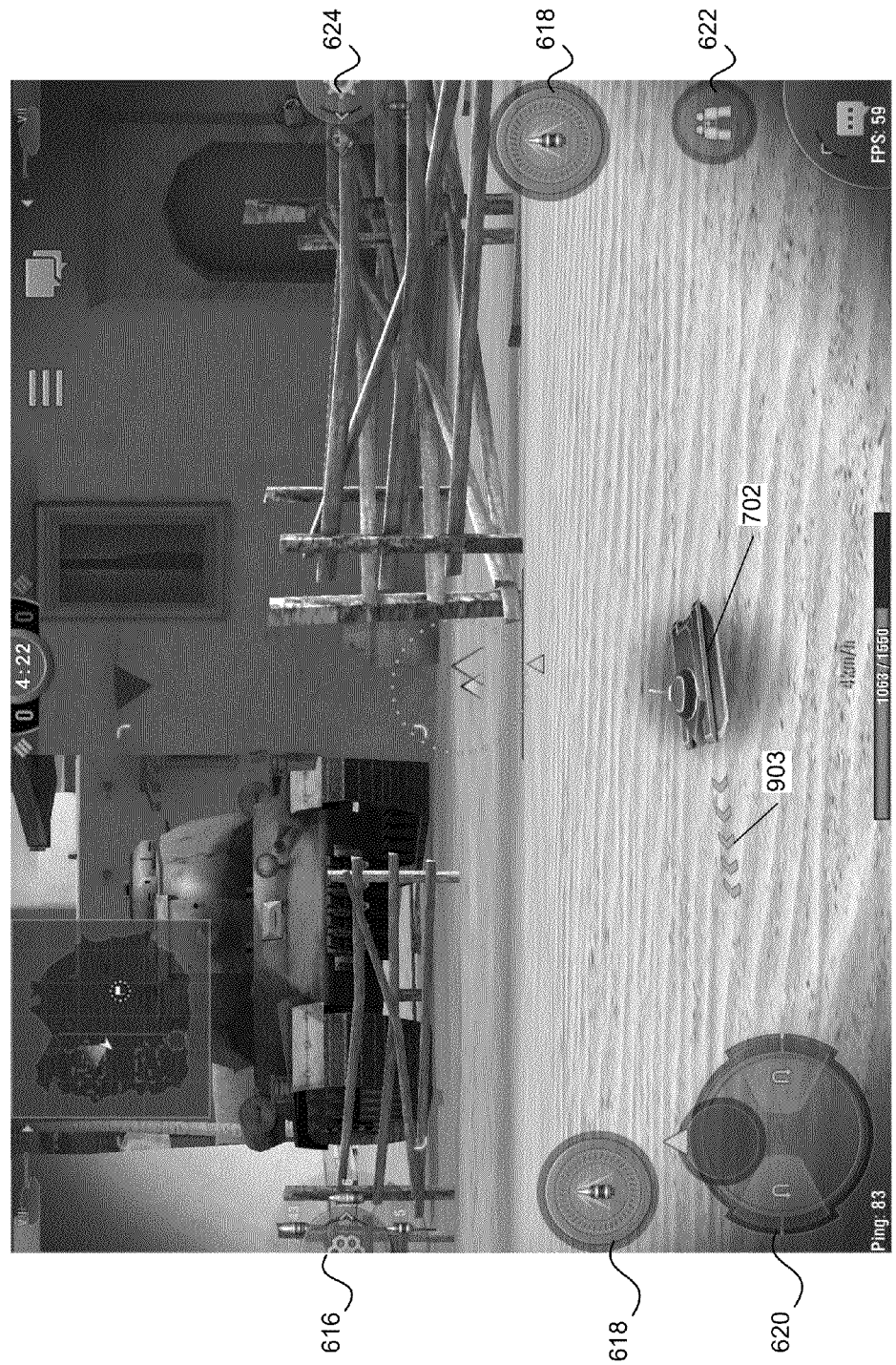
FIG. 9 illustrates a screenshot of a video game user interface implementing one or more illustrative aspects described herein.

According to an aspect, a miniature version or model 702 of vehicle 602 may be included in this view to show the player the orientation of vehicle 602 relative to the current viewpoint and the travel direction arrows of the vehicle 602 which are illustrated in FIGS. 8 and 9. Model 702 may be a more simplistic version of vehicle 602 such as a smaller icon or figure or other visual representation of full size vehicle 602. In the example shown in FIG. 7, model 702 is a figure with the general outline of portions of the full size vehicle. For example, model 702 shows a general shape of turret 608 and hull 610 of tank vehicle 602. The figure used can also differ depending on the type or category of the full size character or vehicle. A common representation or model may be used for vehicles of each type. For example, a representative model of each category of Self Propelled Guns (SPG, or artillery), Light Tanks, Medium Tanks, Heavy Tanks, and Tank Destroyers may be used. In another example, one common model may be used for tank vehicles having pivotable turrets and another common model may be used for tank vehicles with non-pivoting turrets. The positioning of model 702 on the screen may also be adjusted based on a player's preference and can be displayed in any location of the screen. Model 702 may also include a graphical directional indicator such as a specific coloring, shading, or marking in an area of model 702 to indicate the front or back of the vehicle.

Model 702 can further dynamically respond to input which affects the positioning of the vehicle 602 relative to the current viewpoint. For example, for some tank vehicles, the turret can be pivoted independently of the hull of the tank with the player's view following the direction of the turret or the direction of the turret following the player's view. Model 702 can show the position or orientation of the turret 608 relative to the hull 610 of the tank for tank vehicles with this capability. As discussed herein, the direction of a player's view can be changed independently of the direction in which a vehicle or character may travel, so the direction of the player's view may not necessarily be from the front of the vehicle. Model 702 further enables the player to more easily maneuver the vehicle since the player is able to ascertain the direction that a vehicle will travel in response to directional commands. For example, in the view shown in FIG. 7, the front of tank vehicle 602 is pointed in the general direction of the left side of the view as indicated with model 702 such that in response to a forward movement command tank vehicle 602 will travel towards the left side of the view, and the view of the environment will shift towards the left in response to the player's input and resulting movement of tank vehicle 602. Because the turret and hull of a tank vehicle may be controlled separately, the player may maintain the position of the turret relative to the environment while pivoting the hull around the turret, for example, in a clockwise or counter-clockwise direction. The pivoting of hull 610 changes the forward direction of tank vehicle 602, and hull 710 of model 702 can pivot in the same manner as tank vehicle 602. Turret 708 and hull 710 of model 702 can respond similarly to pivoting of one or both turret 608 and hull 610 of tank vehicle 602. Thus, model 702 can dynamically reflect in real-time the positioning of various portions of tank vehicle 602 relative to the current viewpoint and mimic the movement and/or orientation of vehicle 602.

Figure 11A:
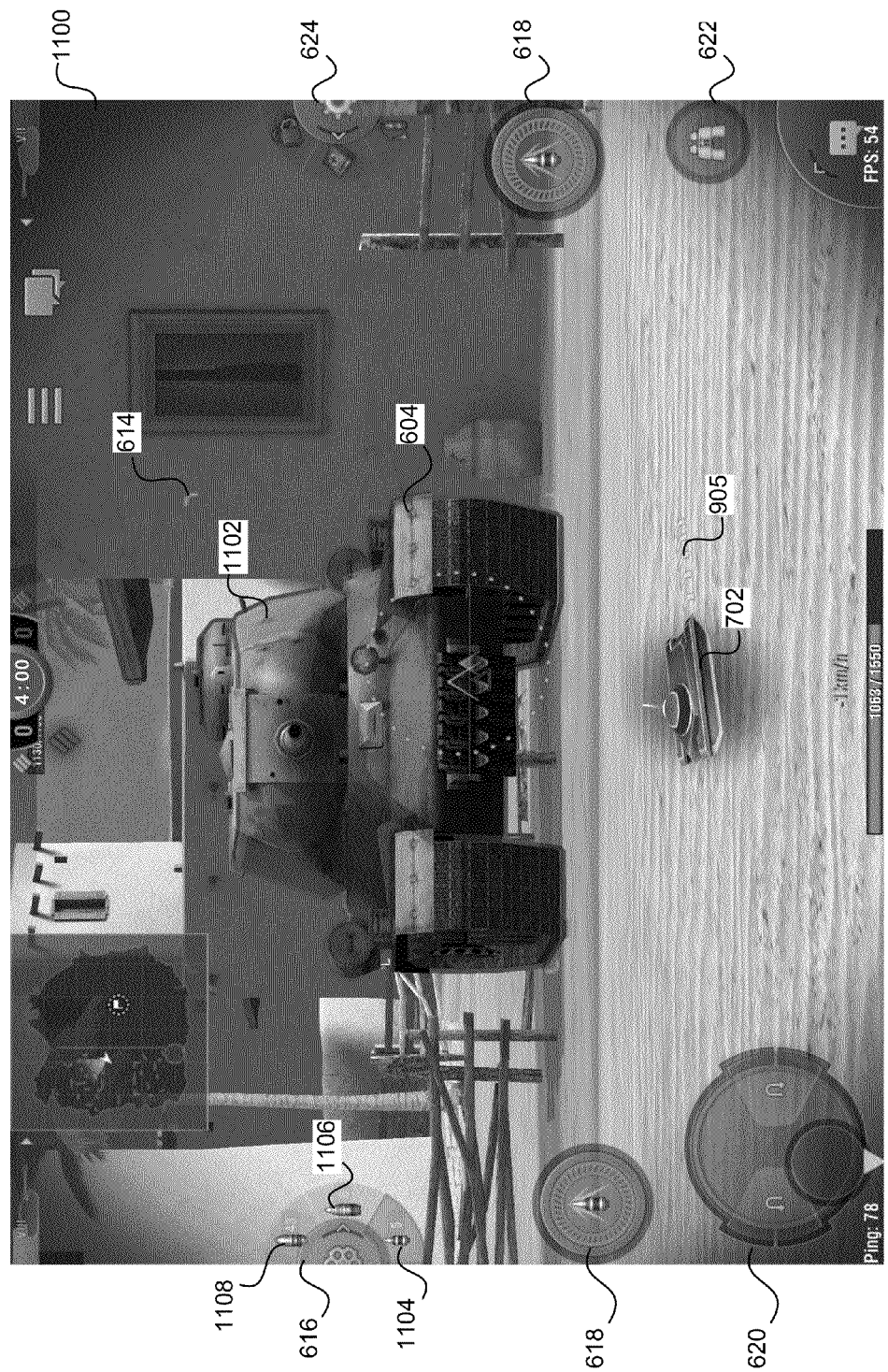
FIGS. 11A and 11B illustrate screenshots of a video game user interface implementing one or more illustrative aspects described herein.
Figure 11B:
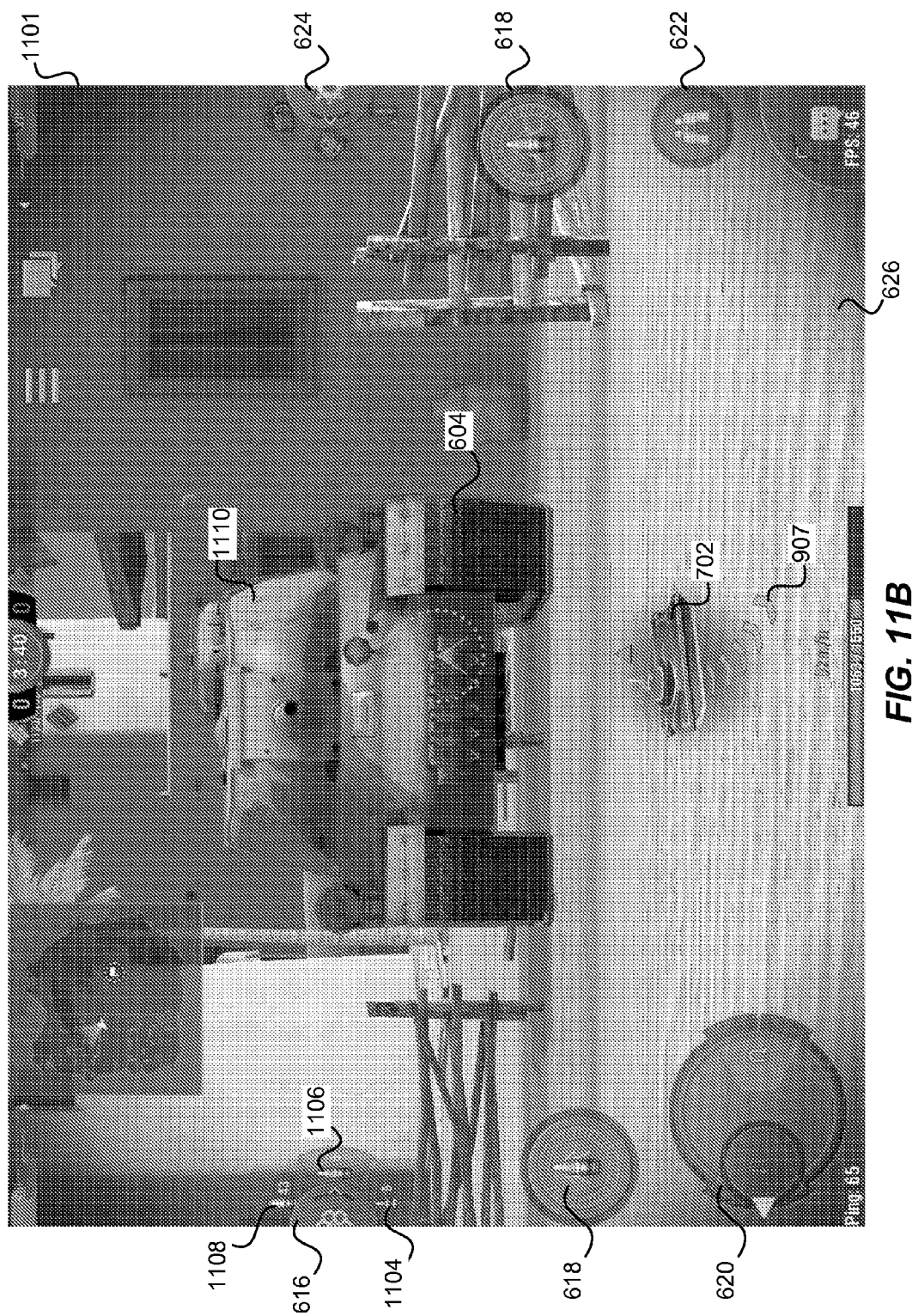

FIG. 8 illustrates an aspect relating to a directional indicator 803 which provides information relating to the direction that tank vehicle 602 is traveling in response to an inputted movement command. As discussed herein, user input can be provided through a virtual controller such as a virtual joystick 620 which is depicted in FIG. 8. In the example shown in FIG. 8, the user is commanding tank vehicle 602 to move in the forward direction, for example, by moving joystick 620 in the up direction. In response to receiving a forward movement command, tank vehicle 602 moves in the forward direction, and directional indicator 803 is displayed to show the direction that tank vehicle 602 is traveling. Directional indicator 803 may be in the form of a set of arrows pointing in the direction of travel as shown in FIG. 8. Different sets of arrows can be used for movement in different directions, such as forward, backward, turning, and pivoting. Different colors can be used for the arrows to differentiate between different travel directions. For example, different colors may be used for each of forward, backward, and pivoting movements. Arrows may be represented linearly (e.g., aligned with each other along a straight central axis 805) when the vehicle is travelling in a straight line, or aligned along an arced or curved central axis when the vehicle is turning or pivoting (e.g., see FIG. 11B). The arrows may be evenly distributed along central axis 805. The sharpness of the arc or the degree of curvature of the arc in central axis 805 may depend on whether the vehicle is pivoting or turning and the degree to which the vehicle is turning. For example, a sharper arc may be displayed when the vehicle is turning more sharply, and a flatter arc may be displayed when the vehicle is making a slight turn. In other words, the alignment of the arrows or curvature of the central axis may correspond to a general trajectory or projected path of the vehicle. For a forward movement, the arrows may extend from the front of the vehicle, and for a backwards movement, the arrows may extend from the back of the vehicle. As another example, the arrows may curve to the right of the vehicle when the vehicle is turning right and curve to the left of the vehicle when the vehicle is turning left. For a pivoting motion, two sets of arrows may be used as shown in FIG. 11B. The sets of arrows may be on opposing sides of the vehicle and extend along a central axis curved in a clockwise direction from the vehicle when the vehicle is pivoting clockwise. Similarly, the arrows may extend in a counter-clockwise direction when the vehicle is pivoting counter-clockwise.

FIG. 9 illustrates an aspect relating to a directional indicator 903 of the model 702. As shown in FIG. 8, tank vehicle 602 is provided with directional indicator 803 when the tank vehicle is moving such as moving in a particular direction or pivoting. Model 702 which mimics or matches the movement and/or orientation of vehicle 602 may also include a directional indicator 903 which matches directional indicator 803 of the tank vehicle 602. In the example of FIG. 9, tank vehicle 602 is moving in the forward direction in response to a forward movement command as shown in FIG. 8. In the magnified view shown in FIG. 9, the movement of tank vehicle 602 is also reflected by directional indicator 903 for the model 702. Similar to directional indicator 803 for tank vehicle 602, directional indicator 703 may be in the form of a set of arrows aligned along a central axis 903 matching directional indicator 803 having a size proportional to model 702. The proportional size may be the same as the proportion between the directional indicator 803 and the tank vehicle 602. Directional indicator 703 may also reflect a backward or pivoting movement of tank vehicle 602. An example of a backward movement indicator 905 is shown in FIG. 11A. An example of a pivoting directional indicator 907 is shown in FIG. 11B, and tank vehicle 602 would similarly be provided with a pivoting directional indicator comprising two sets of arrows curved in the direction of the pivoting.

Figure 10A:
FIGS. 10A and 10B illustrate screenshots of a video game user interface implementing one or more illustrative aspects described herein.
Figure 10B:

In accordance with another aspect, FIGS. 10A and 10B show a third viewing mode 1000 which includes more than one view of the scenario depicted in FIG. 6. The different views may be any combination of first-person views and third-person views and any combination of magnification or zoom levels. In the example shown in FIG. 10A, a first-person view and a third-person view are used. The third-person view may be a normal or unmagnified view, and the first-person view may be a magnified or zoomed in view. A portion or spatial area of the on-screen display may be used for the first view 1002 which is shown as the first-person magnified view, and the remaining portion of the on-screen display may be the second view 1010 which is shown as the third-person normal view. Alternatively, each view may be first person views having differing magnification levels, or each view may be third-person views having differing magnification levels.

The area of magnified view 1002 may be any size and may depend on a player's preferences. The player may be able to customize the size of the on-screen area and the shape provided for magnified view 1002 as well as the on-screen position of the magnified view an example of which is illustrated in FIG. 10B. In the example shown in FIG. 10A, magnified view 1002 is positioned within reticle 606 by, for example, overlaying a magnification of the area within reticle 606 in the unmagnified view. The center point of the reticle may also serve as the center of the magnified view or zooming point. As can be seen through a comparison of FIG. 6 and FIG. 10A, opposing tank 604 in magnified view 1002 is enlarged such that the user can more precisely aim at portions of opposing tank 604. Using a combination of the two views 1002, 1010, the player is able to more accurately aim while also being aware of the vehicle's surrounding environment. Thus, the player can see objects or obstacles in the environment while also viewing objects at a distance in more detail.

The third viewing mode 1000 shown in FIG. 10A may be produced by generating an unmagnified, third-person view of the environment from a particular view point and generating a magnified view according to a pre-selected or user selected zoom or magnification level of a first-person view of the environment from the same view point. When the user selects to enter third viewing mode 1000, the system can combine the two views by replacing the area displayed within reticle 606 of the unmagnified view with the magnified, first-person view of the environment 1002. In other words, in switching, for example, to third viewing mode 1000 from a full display of the unmagnified view of the environment as shown in FIG. 6, the unmagnified view of the environment is unchanged except for the portion of the display designated for the magnified view, in this example, the area within reticle 606.

In the example shown in FIG. 10A, the magnified view is located within reticle 606 in place of an unmagnified view. The two views may also be displayed together on-screen with a gradual reduction of the magnification level in an intermediate area 1006 between magnified area 1002 of the displayed screen to unmagnified area 1010 of the screen. In intermediate area 1006, the magnification level may be reduced as the distance from magnified area 1002 increases to gradually blend the different views. For example, with FIG. 10A, the immediate screen area outside of reticle 606 may be magnified but have a lesser magnification level than the area within reticle 606. As the on-screen distance from reticle 606 increases within intermediate area 1006, the magnification level can decrease resulting in a magnification level that changes as a function of the radial screen distance from magnified view 1002 such that there is not a clear distinction between the magnified area and unmagnified area.

According to another aspect, any number of views may be shown on the screen. For example, another magnified view may be shown on the screen with a magnification level different than magnified view 1002. The second magnified view may be of the same area of the environment as first magnified view 1002 or of a different area of the environment.

According to some aspects, the magnification level or zoom settings of the magnified view may be controlled in a variety of ways. For example, the player can manually adjust the magnification level or zoom settings of the magnified view. The player can increase or decrease the zoom or magnification level while a magnified view is being actively displayed. The magnification level may also or alternatively depend on a weapon or vehicle in use by the player. The magnification level may further be automatically determined based on a distance between tank vehicle 602 and a targeted object such as tank vehicle 604. If no object is being targeted, a default magnification level may be used.

Magnified view 1002 may also include a model 702 of the player's vehicle similar to the magnified view described with respect to FIG. 7. As can be seen in FIG. 10A, the orientation of the turret relative to hull of model 702 is the same as tank 802. Further, the overall orientation of tank 802 and model 702 relative to the viewpoint of the player is the same. Moreover, the model 702 responds in the same way to input controlling or changing the orientation or position of tank 802 as tank 802. For example, in response to a command to pivot turret 808 of tank 802, the turret of model 702 will pivot from the same starting point in the same direction and at the same rate as the turret of tank 802. In other words, model 702 identically mimics the movement of the corresponding parts of tank 802.

FIG. 10B depicts an illustrative view of another aspect including different views. As discussed above, the user can customize various aspects of the view including the on-screen position, size, and shape of a magnified view such as magnified view 1002. In a preferences setting, the user can select a preferred on-screen position or location for a magnified view. The user may be able to manipulate a simulated magnified view in a simulated viewing mode with two different magnified views in the preferences setting. The user can move the simulated magnified view to the user's preferred position and change the size and shape of the magnified view according to the user's preferences. The software may store this preference for later retrieval and use when the user switches to a viewing mode including a magnified view.

In the example shown in FIG. 10B, the user has selected to have magnified view 1002 positioned in the upper right corner of the display and for magnified view 1002 to have a rectangular shape such that the magnified view is not limited to only the area within reticle 606. The feature of enabling the user to position the magnified view according to the user's preferences allows the user to maintain a normal view of the environment while allocating a portion of the screen which may be less useful to the user to show the magnified view. In the example of FIG. 10B, the user can still see other tank vehicles which may be approaching on the ground while at the same time seeing a zoomed in view of targeted tank vehicle 604. The user may also be able to see other tank vehicles within reticle 816 of unmagnified view 1010 which may not be shown in magnified view 1002 due to the magnification.

In yet another aspect, magnified view 1002 may include a potential damage indicator which will be described in more detail with respect to FIGS. 11A, 11B, and 14.

FIGS. 11A and 11B show another aspect that can be displayed in an unmagnified or magnified view. In a video game, the player can control a weapon and cause damage to a targeted object by firing the weapon at the targeted object. Various areas of a target may have different armor levels for different weapons and thus have different vulnerabilities to different weapons. A player would find it helpful to have knowledge of the strengths and weaknesses of a targeted object depending on the weapon selected and/or ammunition selected for the weapon. This information may be provided in the form of a potential damage indicator. The potential damage indicator can, for example, be static or dynamic. A static damage indicator may be calculated based on the type of armor and/or the strength of the armor on a portion or region of the targeted object and/or particular characteristics of the selected weapon against the type of armor on the targeted object as well as the current damage level of the targeted object. A dynamic potential damage indicator may be a real-time reflection of a probability of inflicting damage on portions of a targeted object. The dynamic potential damage indicator may be based on calculations similar to those performed for the static damage indicator and can further take into account changing conditions such as the weather, wind speed, and traveling speed and direction of the player and/or the opponent's tank vehicles which may affect the force of the impact of a weapon on a targeted object and the aiming accuracy of the weapon. The potential damage indicator may further take into account a potential angle of impact when the selected ammunition hits the armor. The potential angle of impact can be determined from various factors including the exit velocity of the ammunition from the gun, the angle at which the gun is aimed at the targeted object, and the surface angle of the armor at the point of impact. A projected or estimated trajectory of the ammunition can be calculated from these factors.

A player's weapon may be a gun which can be used with different types of ammunition where the ammunition can cause different amounts of damage to a target (e.g., opponent's vehicle or character or building) depending on a variety of variables such as the type of ammunition (e.g., armor piercing shell, high explosive shell, armor-piercing composite rigid shell, grenade, missile, bomb), the point of impact on the target, the distance from the target, traveling speed and direction, the size of the ammunition, and the type of gun (e.g., long barrel, short barrel, sniper rifle, machine gun) used with the ammunition. In the example of a tank vehicle weapon, one type of ammunition may be an armor piercing shell which is especially damaging for a particular type of armor. Another example is a high explosive shell which can be especially damaging for the tracks of a tank vehicle and at close range to the target.

The ammunition can also have different levels of accuracy. For example, while the point of aim may indicate the aiming point of the weapon, the fired ammunition might not hit that exact point. Accuracy of a weapon may be represented with an on-screen indicator around the point of aim where the area within the accuracy indicator may indicate the probability that the weapon will hit a target within the area indicated by the accuracy indicator.

FIGS. 11A and 11B illustrate examples of a potential damage indicator 924 which may be in the form of a shading or coloring or other indicator overlayed or otherwise presented on a targeted object. Using the potential damage indicator 924, a player may determine the best and/or least armored portions of a targeted object. FIG. 11A shows a screenshot of a magnified view 1100 including an opponent's tank vehicle 604 with a potential damage indicator 1102 based on the currently selected ammunition.

In the example shown in FIG. 11A, an armor piercing composite rigid (APCR) shell for the gun of the player's tank vehicle is selected. Potential damage indicator 1102 is shown in the form of a colored shading that is different from the original color of the tank. The tank may also be outlined in the same color as the damage indicator when the targeted tank is an enemy tank. Saturation level or darkness of the colored shading may be used to indicate portions or regions of the tank which possess stronger armor or weaker armor which will better withstand damage from a shell or the probability in which the selected gun and ammo type will penetrate the armor. Lighter portions or those which have less shading or color saturation in the particular damage indicator color may be more poorly armored such that there is a greater likelihood that contact with a shell will incur damage and/or that the selected ammunition may cause greater damage compared to other regions of the targeted object. In other words, the portions of the tank which have less shading or color saturation may have weaker armor. Alternatively, darker portions or those which have more shading or color saturation in the particular indicator color may be more poorly armored such that there is a greater likelihood that contact with a shell will cause damage and/or that the selected ammunition may cause greater damage compared to other regions of the targeted object. The regions of the tank may be determined by the types of parts within the region. For example, the hull of the tank may have stronger armor and therefore be less susceptible to attacks while the tracks of the tank may be a weaker point of the tank. The turret may also have the same level of armor throughout.

Other forms of visual indicators may be used to provide a player with information about the stronger and weaker portions of a tank for a particular weapon selection such as a graphical or visual pattern, different colors, text indicators, numerical indicators, and a flashing pattern. The different types of damage indicators may be used alone or in combination with each other.

FIG. 11B shows an example of a potential damage indicator 1108 when another weapon and/or ammunition is selected. Ammunition selection panel 616 may be used to select ammunition to be loaded into the gun. For example, ammunition selection panel 616 includes an armor piercing composite rigid shell 1104, a high explosive shell 1106, armor piercing 1108. In the example shown in FIG. 11B, a high explosive shell is selected for the tank gun. Similar to FIG. 11A, damage indicator 1110 may be shown in a magnified view. In the magnified view, the player is able to better discern between the various portions of the tank with different armor weaknesses/strengths and is able to more precisely aim at the various portions of the tank. Also similar to FIG. 11A, damage indicator 1110 uses a shading or saturation level of a color to indicate strong and weak parts of the tank. As can be seen by comparing FIGS. 9A and 11B which display damage indicators 1102, 1110, different weapons selections can result in different strengths and weaknesses for the same target. With the selection of high explosive shell 1106 in FIG. 11B the majority of the hull and the turret of the opponent's tank 604 are relatively strong against the high explosive shell. The tracks of tank 604 however are relatively vulnerable to the high explosive shell and are shown without a shading in FIG. 11B.

Figure 12:
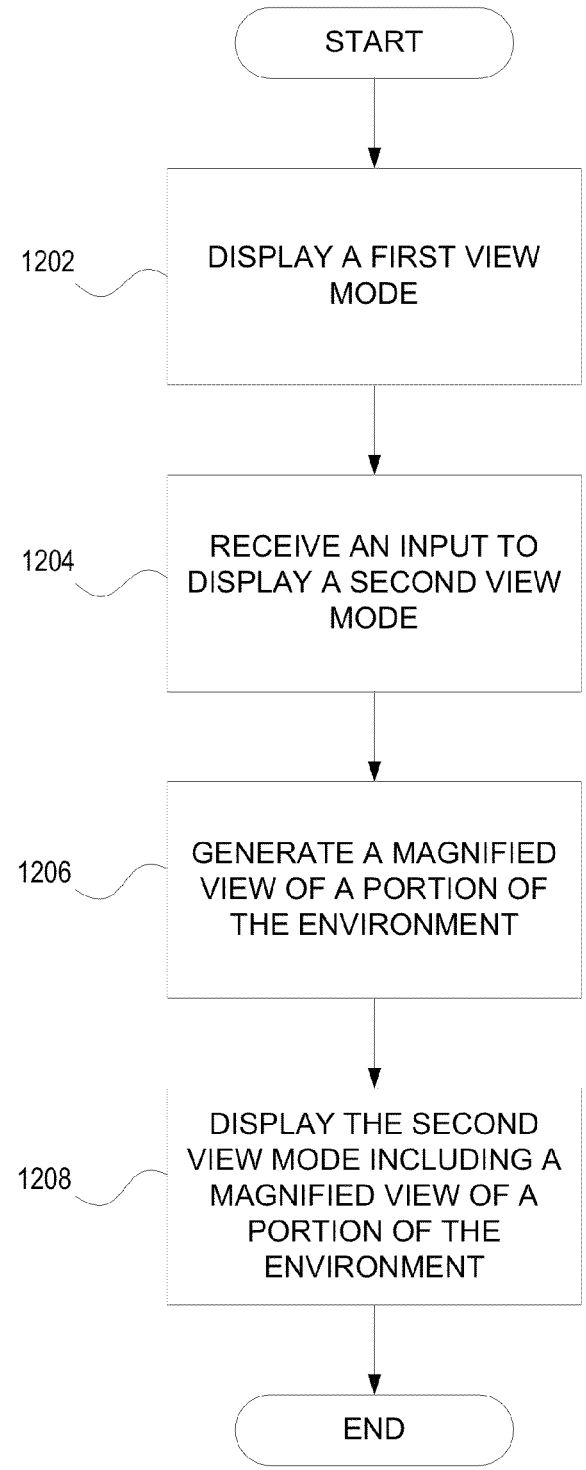
FIG. 12 illustrates a flowchart for a method of providing two different views of an environment according to one or more illustrative aspects described herein.

FIG. 12 illustrates a flowchart of a method of providing a view including at least two different views according to an aspect, for example, as shown in FIG. 8. At step 1202, a first viewing mode may be presented on a display device by a module (e.g., UI module and/or graphics module). The first viewing mode may be, for example, an unmagnified or normal first-person or third-person view of a simulated environment based on an object (e.g., character or vehicle) controlled by a user or player. At step 1204, a module (e.g., input module) may receive a player input to enter a specific viewing mode. For example, the player may choose or select a button or option to enter a second viewing mode where at least a portion of the displayed environment includes a magnified view of a portion of the environment.

In response to the player input, a magnified view of a portion of the environment may be generated at step 1206. For example, the client software 205 may retrieve or otherwise obtain data about objects in the environment from the world database 203. The data about objects in the environment may include dimensional information which may be multiplied or otherwise manipulated to obtain enlarged dimensions for the magnified view. The client software 205 may graphically render the magnified view information using the dimensional information received from the world database 203. The client software 205 can also generate the magnified view based on the number of display units used to display each portion of the unmagnified view. For example, if 10 pixels are used to display a particular area of the environment, the client software can generate a magnified view of the same area for a view that is magnified to be twice as large by using 20 pixels to display the same area. The magnified view may be centered around a reticle overlayed on the view of the simulated environment. According to another aspect, the client software 205 may generate an intermediate area positioned between the magnified view and the unmagnified view. For the environment displayed in the intermediate area, the client software can calculate a magnification level for each point or range of points based on the distance or range of distances of the point or range of points from the magnified view. For example, the greater the distance a point on the display is from the magnified view the less the magnification level assigned for the particular point is. As an example, if the magnified view magnifies an area by 3 times and the radial distance of the intermediate area between the magnified view and the unmagnified view is 1 inch, the magnification level for a radial distance from the magnified view between 0 to 0.5 inches may be 2 times, and the magnification level for a radial distance from the magnified view between 0.5 inches and 1 inch may be 1.5 times.

At step 1208, the second viewing mode may be displayed on a display device. In the second viewing mode, at least a portion of the display may be used to present a magnified view of a portion of the simulated environment. The positioning of the magnified view of the environment may be based on user preferences. The system may retrieve user preferences of the location of the magnified view from memory and may superimpose or overlay the user designated portion of the display with the magnified view. In the example shown in FIG. 10B, the system can generate the unmagnified view and generate a magnified view centered around the center of reticle 816. In the area designated by the user in the user preferences as being used for the magnified view, the system can display the magnified view 1002 instead of the normal, unmagnified view 1010. A smaller model of the full scale version of the player's vehicle may be presented on the screen with the magnified view. The model may follow changes to the positioning of portions of the controlled vehicle relative to the displayed point of view in response to commands affecting the positioning of the full size version of the vehicle. In one aspect, the client software may consult world database 311 for movement information of the player's vehicle and may apply the same movement information to the movement of the smaller model.

Figure 13:
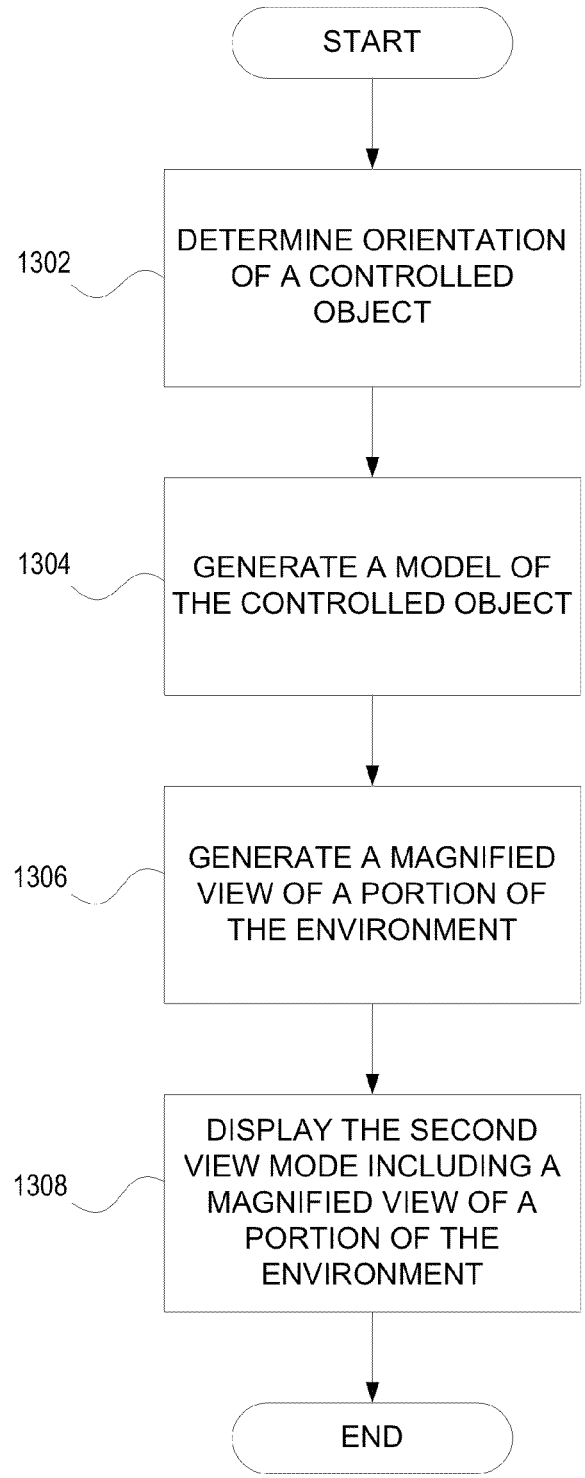
FIG. 13 illustrates a flowchart for a method of providing a second version of a controlled object according to one or more illustrative aspects described herein.

FIG. 13 illustrates a flow chart of an example of a method of displaying a view including a magnified and unmagnified view and a model of a controlled object. At step 1302, the current orientation of a controlled object (e.g., vehicle or character) with respect to the current view and with respect to moveable portions of the controlled object can be determined. At step 1304, a model of the controlled object can be generated based on the current orientations of the controlled object. At step 1306, a magnified view of a portion of the environment is generated. As discussed herein, the portion of the environment to be magnified may be based on a player's view of the environment and may be centered on the environment located in the center of the view. Similarly, the magnified portion of the environment may be the portion of the environment in and around a reticle overlayed on the environment in that the view zooms in on the point at the center of the reticle. At step 1308, a second view mode may be displayed in which a portion of the display is dedicated to an unmagnified view and a portion of the display is dedicated to a magnified view. For example, the apparatus or system executing the software may cause a display device to show a magnified environment in a portion of the view and an unmagnified environment in a portion of the view as described with respect to FIGS. 10A and 10B. The view shown may also be of two or more portions of the environment with different magnification levels.

Figure 14:
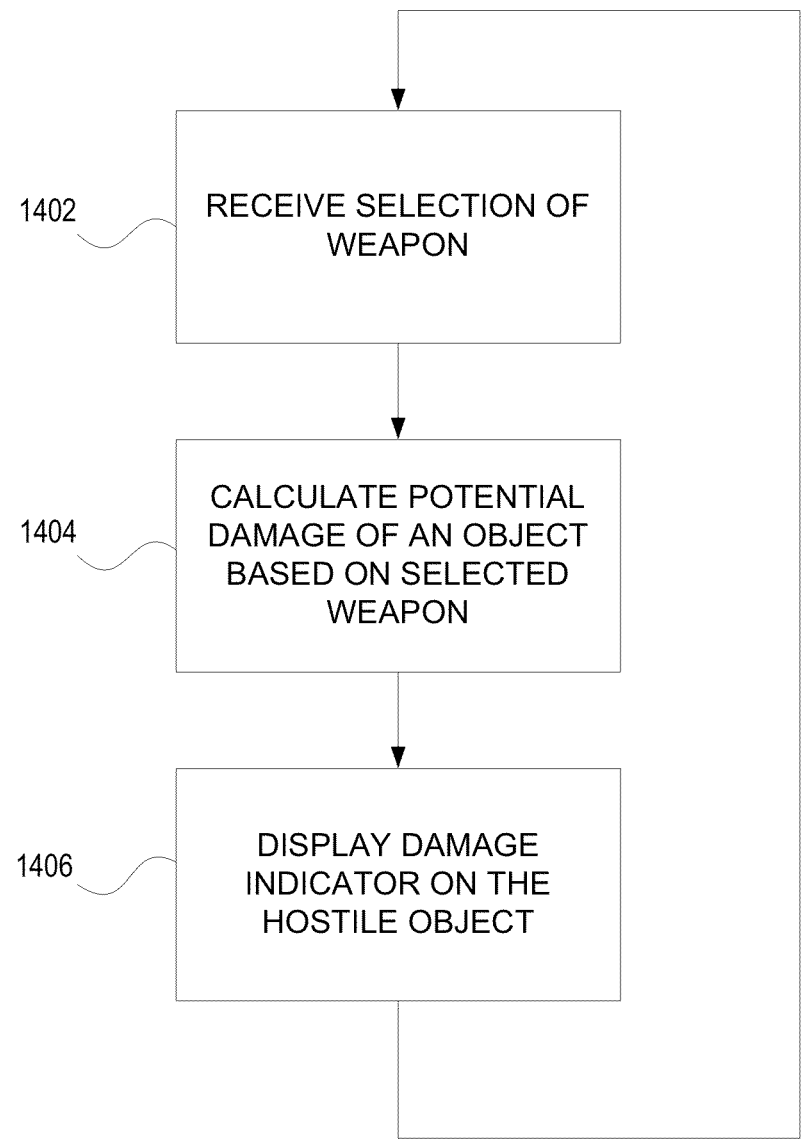
FIG. 14 illustrates a flowchart for a method of providing a potential damage indicator based on a weapon selection according to one or more illustrative aspects described herein.

FIG. 14 shows a flowchart of an exemplary method according to an aspect of the disclosure relating to displaying a potential damage indicator. At step 1402, a selection of a weapon may be received. Potential damage to a targeted object based on the currently selected weapon may be calculated at step 1404 such as a probability of causing damage or a potential degree of damage. The potential damage to a targeted object may depend on a number of variables such as the distance between the targeted object and the location from which the weapon is fired, the armor or shield and other attributes of the targeted object, the current amount of damage to the targeted object, the type of weapon currently selected, conditions in the environment (e.g., weather, temperature, wind speed and direction, gravity) and the point and/or angle at which the weapon makes contact with the targeted object. Potential damage to a targeted object may be calculated for each point or region on the object. According to an aspect, the calculated potential damage for a particular location may be based on the particular location being the point of impact for a weapon. This calculation may be performed for each location on the targeted object. To calculate the potential damage, client software may retrieve attribute information of the targeted object from the virtual world server or retrieve attribute information stored in the world database 203 that was previously received from the virtual world server. The calculated potential damage may be provided to the player in the form of a visual or graphical damage indicator. For example, for a targeted tank vehicle object, the tank vehicle object may have at least the attributes shown in and described with respect to FIG. 5B. The targeted tank may have three regions with different potential damage levels which may be based on armor strength levels. The tank vehicle may have hull armor with a certain strength level and turret armor with a strength level different from the hull armor while the tracks of the tank vehicle may have another armor strength level. A potential damage level can be calculated for each region using the attributes of the selected weapon. For example, a potential damage value may be obtained by comparing a damage value of the selected weapon with a strength value for the armor and calculating a potential damage values based on the difference. Another factor in the potential damage value may be the standard shell damage value and standard shell penetration value. This factor may be included in the potential damage calculation by comparing the standard shell penetration and damage values of the targeted vehicle with the shell penetration and damages values of the selected weapon.

According to another aspect, the potential damage of a targeted object may be calculated for the entirety or for each part of the targeted object based on the current conditions such as the projected point of impact on the object, current environment conditions, current distance from the targeted object, and armor or shield strength of the targeted object. The potential damage may take into account the radius of damage for a particular weapon. For example, a shell may inflict the greatest amount of damage at the point of impact, and the amount of damage will decrease as the distance from the point of impact increases.

Accordingly, at step 1406, the damage indicator may be displayed on the targeted object. The damage indicator may be, for example, in the form of a certain color, shading, or pattern for portions of the targeted object where the color, shading level or saturation level, or the pattern used may indicate different amounts of potential damage. A particular damage level or probability level may correspond to a certain saturation level of the shading where the greater the damage or probability level the less saturated the shading and vice versa. For example, there may be three damage or probability levels and three different shading levels corresponding to the three damage or probability levels.

This damage indicator may also be dynamic in that the damage indicator may change depending on the current conditions in the simulated environment and in response to selecting a different weapon. As shown in FIG. 14, the method may return to step 1402 in response to the selection of another weapon.

According to another aspect, a magnified view may provide a user with a more detailed view of a portion of the environment including a targeted object and the magnified view may be particularly useful in more accurately aiming a weapon as described herein. The damage indicator may be provided in the magnified view where the user is able to discern potential damage to parts of the targeted object based in part on the currently selected weapon. While a magnified view and damage indicator are displayed, a user may be able to change the selection of a weapon. Since the damage indicator can dynamically change based on which weapon is currently selected, the player is able to repeatedly select different weapons and visually see which weapons are most effective against the targeted object and where the weak points on the targeted object are for the currently selected weapon. For example, a gun of a tank vehicle may be used with different types of ammunition. A first type of ammunition may be particularly effective against the tracks of an opponent's tank vehicle while a second type of ammunition may be particularly effective against the particular armor used on an opponent's tank vehicle.

While the steps of the methods illustrated in FIGS. 12-14 are described and shown in a particular order, these steps may be rearranged and performed in any order.

The present aspects have been described in terms of preferred and illustrative embodiments. Numerous other embodiments, modifications and variations within the scope and spirit of the appended claims will occur to persons of ordinary skill in the art from a review of this disclosure.

The invention claimed is:

1. A method, comprising:
    providing a plurality of vehicles selectable by a user to be used in a simulated environment;
    receiving a selection of one of the plurality of vehicles;
    in a first viewing mode, displaying the simulated environment including the selected vehicle, the selected vehicle including two independently controlled portions having orientations relative to each other;
    entering a second viewing mode of the simulated environment in response to receiving a user input to change viewing modes; and
    in the second viewing mode, displaying a model of the selected vehicle and a second view of the simulated environment, wherein the model corresponds to two or more of the plurality of vehicles selectable by the user and the model has an orientation consistent with the orientation of the selected vehicle.

2. The method of claim 1, wherein the model of the vehicle corresponds to a type of the vehicle.

3. The method of claim 1, wherein the first viewing mode displays an unmagnified view of the simulated environment, and wherein the second viewing mode displays a magnified view of the simulated environment.

4. The method of claim 1, further comprising:
    receiving an input causing a change in orientation of portions of the selected vehicle;
    maintaining a matching orientation of the model with the selected vehicle by changing the orientation of the portions of the model to be consistent with the selected vehicle.

5. The method of claim 4, wherein the selected vehicle is a tank vehicle comprising a turret and a hull and the model comprises a turret and a hull, wherein the input causes the turret of the tank vehicle to pivot a first number of degrees in a first direction, and wherein maintaining the matching orientation of the model with the selected vehicle comprises pivoting the turret of the model the first number of degrees in the first direction.

6. The method of claim 4, wherein the selected vehicle is a tank vehicle comprising a turret and a hull and the model comprises a turret and a hull, wherein the input causes the hull of the tank vehicle to pivot a first number of degrees in a first direction, and wherein maintaining the matching orientation of the model with the selected vehicle comprises pivoting the hull of the model the first number of degrees in the first direction.

7. The method of claim 1, further comprising:
    receiving a movement command moving the selected vehicle;
    in response to receiving the movement command, displaying a directional indicator corresponding to the movement command for the model of the selected vehicle.

8. The method of claim 7, wherein the directional indicator comprises at least one set of arrows aligned along a central axis and a curvature of the central axis depends on the movement command.

9. The method of claim 8, wherein the movement command is a forward movement command causing the selected vehicle to travel in a forward direction in the simulated environment, and wherein the directional indicator comprises one set of arrows aligned along a linear central axis extending from a front of the selected vehicle.

10. The method of claim 9, wherein when the selected vehicle is traveling forward while turning in a first direction, the directional indicator comprises one set of arrows aligned along a central axis extending from the front of the selected vehicle curved in the first direction.

11. One or more tangible non-transitory computer readable media storing computer readable instructions that, when executed by a data processing device, cause a system to perform:
    providing a plurality of vehicles selectable by a user to be used in a simulated environment;
    receiving a selection of one of the plurality of vehicles;
    in a first viewing mode, display the simulated environment including the selected vehicle, the selected vehicle including two independently controlled portions having orientations relative to each other;
    entering a second viewing mode of the simulated environment in response to receiving a user input to change viewing modes; and
    in the second viewing mode, displaying a model of the selected vehicle and a second view of the simulated environment, wherein the model corresponds to two or more of the plurality of vehicles selectable by the user and the model having an orientation consistent with the orientation of the selected vehicle.

12. The computer readable media of claim 11, wherein the model of the vehicle corresponds to a type of the vehicle.

13. The computer readable media of claim 11, wherein the orientation of the model matches the orientation of the selected vehicle.

14. The computer readable media of claim 11, wherein the first viewing mode displays an unmagnified view of the simulated environment, and wherein the second viewing mode displays a magnified view of the simulated environment.

15. The computer readable media of claim 11, wherein the computer readable instructions, that when executed by the data processing device, cause the system to perform:
receiving an input causing a change in orientation of portions of the selected vehicle in a first manner;
maintaining a matching orientation of the model with the selected vehicle by changing the orientation of the portions of the model to be consistent with the selected vehicle in the first manner.

16. The computer readable media of claim 11, wherein the computer readable instructions that, when executed by the data processing device, cause the system to perform:
receiving a movement command moving the selected vehicle;
in response to receiving the movement command, displaying a directional indicator corresponding to the movement command for the model of the selected vehicle.

17. The computer readable media of claim 16, wherein the directional indicator comprises at least one set of arrows aligned along a central axis and a curvature of the central axis depends on the movement command.

18. An apparatus, comprising:
a processor; and
a memory storing instructions, that when executed by the processor, cause the apparatus to:
provide a plurality of vehicles selectable by a user to be used in a simulated environment;
receive a selection of one of the plurality of vehicles;
in a first viewing mode, display the simulated environment including the selected vehicle, the selected vehicle including two independently controlled portions having orientations relative to each other;
enter a second viewing mode of the simulated environment in response to receiving a user input to change viewing modes; and
in the second viewing mode, display a model of the selected vehicle and a second view of the simulated environment, wherein the model corresponds to two or more of the plurality of vehicles selectable by the user and the model having an orientation consistent with the orientation of the selected vehicle.

19. The apparatus of claim 18, wherein the instructions, that when executed by the processor, cause the apparatus to:
receive an input causing a change in orientation of portions of the selected vehicle;
maintain a matching orientation of the model with the selected vehicle by changing the orientation of the portions of the model to be consistent with the selected vehicle.

20. The apparatus of claim 18, wherein the instructions, that when executed by the processor, cause the apparatus to:
receive a movement command moving the selected vehicle;
in response to receiving the movement command, display a directional indicator corresponding to the movement command for the model of the selected vehicle.

* * * * *